UNITED STATES PATENT OFFICE.

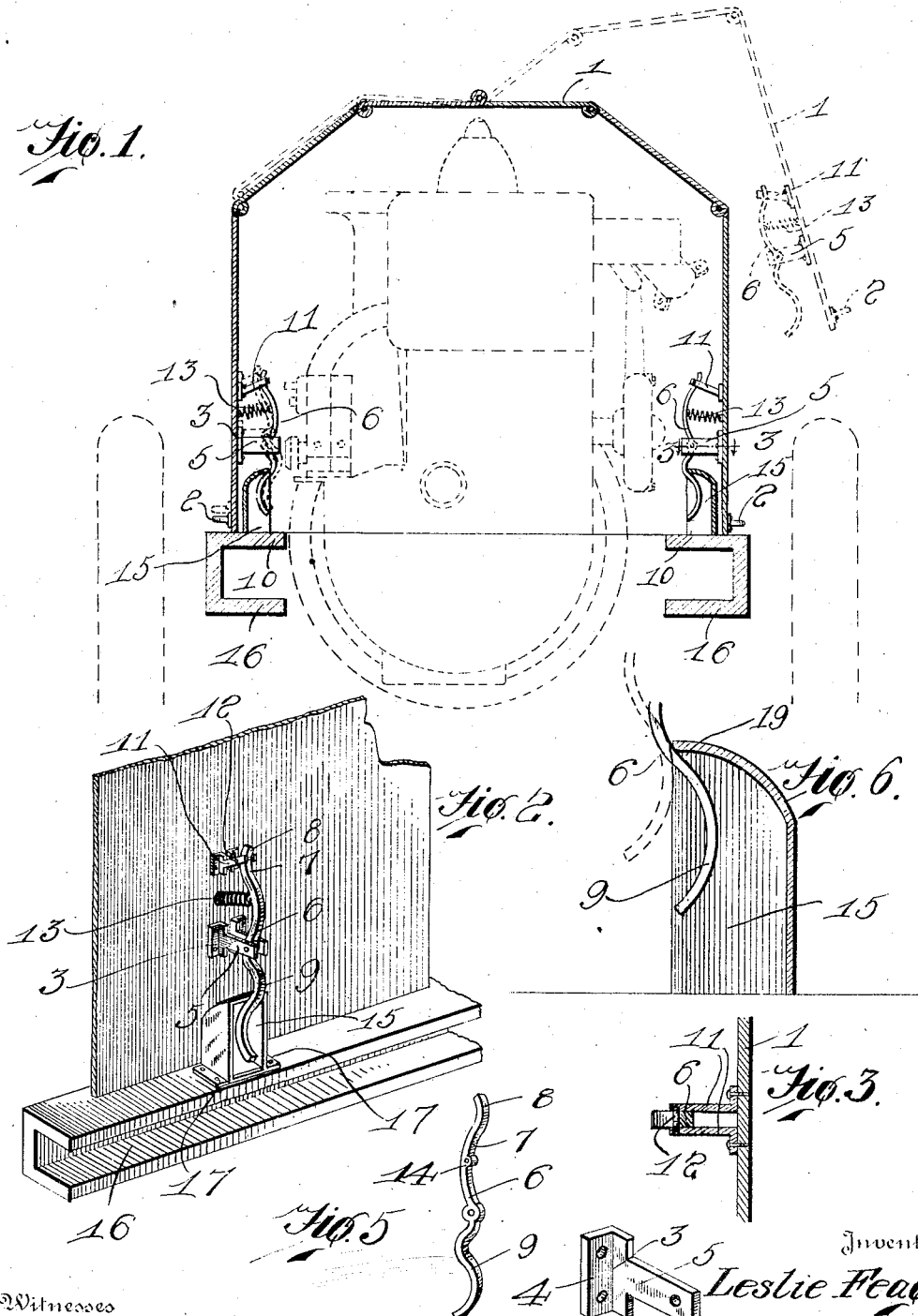

LESLIE FEAGAN, OF MALTA BEND, MISSOURI.

ENGINE-HOOD FASTENER.

1,113,320.  Specification of Letters Patent.  Patented Oct. 13, 1914.

Application filed February 9, 1914. Serial No. 817,608.

*To all whom it may concern:*

Be it known that I, LESLIE FEAGAN, a citizen of the United States of America, residing at Malta Bend, in the county of Saline and State of Missouri, have invented certain new and useful Improvements in Engine-Hood Fasteners, of which the following is a specification, reference being had therein to the accompanying drawing.

This invention relates to automobile engine hoods and has for its object the production of a simple and efficient means for holding the hood against accidental removal from the body of the automobile and at the same time allowing the same to be readily placed upon the frame of the automobile over the engine or removed therefrom.

Another object of this invention is the production of a simple and efficient catch for holding the engine hood detachably upon the body or frame of an automobile.

With these and other objects in view this invention consists of certain novel combinations, constructions, and arrangements of parts as will be hereinafter fully described and claimed.

In the accompanying drawing:—Figure 1 is a transverse sectional view through an automobile hood showing the securing device applied thereto. Fig. 2 is a detail perspective of the inner portion of the hood showing the fastener in perspective. Fig. 3 is a transverse section taken on line 3—3 of Fig. 1. Fig. 4 is a detail perspective of one of the supporting brackets for the pivoted catch. Fig. 5 is a detail perspective of the pivoted catch used in connection with the present invention. Fig. 6 is a vertical section through one of the socket casings, showing the manner in which the latch member engages the same.

By referring to the drawings it will be seen that 1 designates the hood which is of the usual construction and is provided with a hand-hold 2 upon each side thereof to facilitate the handling of the hood. The side walls of the hood are each provided with a pair of spaced brackets 3, which brackets are provided with laterally extending base portions 4 having projecting tongues 5. Between the projecting tongues 5 is pivotally supported a spring pressed latch member 6, which latch member 6 is provided with an upwardly extending end 7 terminating in a curved upper portion 8. The lower end of the latch 6 terminates in a downwardly curved portion 9.

A pair of stop brackets 11 are supported upon the inner face of the side walls of the hood 1, and these brackets 11 carry a stop pin 12, which pin is adapted to limit the rearward swing of the lower end of the latch 6. A coil spring 13 is secured to the lug 14 of the latch 6 and is also secured to the inner face of the hood 1 so as to normally exert an outward pressure upon the upper end of the latch 6.

A socket casing 15 is carried upon each side of the frame 16 of the automobile and comprises a substantially hollow rectangular body having angularly extending feet 17 for facilitating the securing of the casing 15 to the frame of the automobile 16. The casing 15 is provided with an overhanging upper end 19 for receiving the downwardly curved end 9 of the latch 6 for constituting an efficient means for holding the latch in firm engagement with the casing 15. It should be understood that the coil spring 13 by exerting an outward pull upon the upper end of the latch 6 will tend to force the downwardly curved end 9 of the latch 6 outwardly. The pin 12, however, will limit the outward swing of the end 9 of the latch 6 so as to at all times hold the latch 6 in an operative position. When the hood is being placed in position upon the frame of the automobile and the sides thereof brought down to the position shown in full lines in Fig. 1 from the position shown in dotted lines in Fig. 1, the downwardly curved end 9 will engage the upper end 19 of the casing 15 and be forced outwardly until the same passes the upper end 19. The latch 6 will in this manner be directed to its correct position shown in full lines in Fig. 3.

It, of course, should be understood that the latch 6 is only adapted to hold the hood against accidental removal from the body of the automobile, but if it should be desired to remove the hood from the body it will only be necessary to lift upwardly upon the handles 2, and by giving a sudden pull upon the handle the latch 6 will be released from the casing 15 and the hood may be opened or entirely removed from the body of the automobile.

Having thus described the invention what is claimed as new, is:—

A device of the class described comprising a support, socket members carried by said support, each socket member comprising an open-sided casing provided with an overhanging upper end, a hood, a spring latch pivotally supported within said hood, said latch provided with a downwardly and forwardly bent end for fitting under said overhanging upper end, means for limiting the inward swing of the upper end of said latch, and means for exerting an outward pressure upon the upper end of said latch.

In testimony whereof I hereunto affix my signature in presence of two witnesses.

LESLIE FEAGAN.

Witnesses:
 Mrs. R. B. FEAGAN,
 F. E. DICKEY.